United States Patent [19]
Arold et al.

[11] Patent Number: 5,800,005
[45] Date of Patent: Sep. 1, 1998

[54] CENTER CONSOLE AREA FOR A FRONT PASSENGER SIDE OF A MOTOR VEHICLE

[75] Inventors: Klaus Arold; Tilo Volkmann; Jürgen Körber, all of Sindelfingen, Germany

[73] Assignee: Mercedes-Benz AG, Stuttgart, Germany

[21] Appl. No.: 716,796

[22] Filed: Sep. 16, 1996

[30] Foreign Application Priority Data

Sep. 16, 1995 [DE] Germany ................ 195 34 436.7

[51] Int. Cl.⁶ .................................................. B60R 7/00
[52] U.S. Cl. ............................. 296/37.12; 248/311.2; 224/926
[58] Field of Search .................... 296/37.8, 37.12, 296/37.13, 37.15, 37.16; 248/311.2; 297/188.19; 224/539, 544, 926, 281

[56] References Cited

U.S. PATENT DOCUMENTS

| | | | |
|---|---|---|---|
| 3,386,765 | 6/1968 | Drach, Jr. | 296/37.12 |
| 3,414,318 | 12/1968 | Porsche | 296/37.12 |
| 4,453,759 | 6/1984 | Kathiria | 296/37.8 |
| 4,596,416 | 6/1986 | Müller | 296/37.12 |
| 4,708,386 | 11/1987 | Moore et al. | 296/37.8 |
| 5,195,711 | 3/1993 | Miller et al. | 224/544 X |
| 5,618,018 | 4/1997 | Baniak | 224/926 X |

FOREIGN PATENT DOCUMENTS

| | | | |
|---|---|---|---|
| 668 189 A1 | 8/1995 | European Pat. Off. | |
| 1455750C3 | 6/1969 | Germany | |
| 3512808A1 | 10/1986 | Germany | |
| 4032948 | 8/1994 | Germany | 296/37.12 |
| 405270320 | 10/1993 | Japan | 296/37.12 |

*Primary Examiner*—Joseph D. Pape

[57] ABSTRACT

Center console area for a front passenger side of a motor vehicle features mechanical guide elements assigned to a hinge arrangement so that the glove compartment lid is aligned at least in its open end position approximately parallel to and at a narrow distance from the outer contour of the center console area. A receiving device for a beverage container, a bow shaped holder, is integrated into the glove compartment lid and can be swivelled out into a horizontal operating position.

16 Claims, 1 Drawing Sheet

CENTER CONSOLE AREA FOR A FRONT PASSENGER SIDE OF A MOTOR VEHICLE

BACKGROUND AND SUMMARY OF THE INVENTION

This invention relates to a center console area for a front passenger side of a motor vehicle having a glove compartment which is integrated into the center console area, and having a glove compartment lid for closing the glove compartment which is provided with a receiving device for at least one beverage container and which, by means of a hinge arrangement, is movably disposed between an opened and a closed end position.

It is known (Mercedes-Benz passenger cars) to provide a glove compartment on a front passenger side of a center console for a passenger car which can be closed by means of a glove compartment lid which can be folded open. In its folded-open end position, the glove compartment lid projects approximately horizontally toward the front passenger seat and has on its interior side two plate-type indentations which are used as a receiving device for one beverage container respectively, such as a cup with or without a handle. However, in the case of a head impact by the front passenger during an accident, the folded-open glove compartment lid which projects approximately horizontally toward the front passenger seat can result in considerable injuries to the front passenger.

It is an object of the invention to provide a center console area of the initially mentioned type whose safety for the front passenger position is improved and which nevertheless provides sufficient comfort as the result of the presence of receiving devices for beverage containers.

This object is achieved according to preferred embodiments of the invention in that mechanical guiding elements are assigned to the hinge arrangement by means of which, at least in its opened end position, the glove compartment lid is aligned approximately in parallel and at a narrow distance with respect to the outer contour of the center console area and that, as the receiving device for at least one beverage container, at least one bow shaped holder is integrated into the glove compartment lid which can be swivelled out into an approximately horizontal operating position. As the result of the solution according to the invention, the glove compartment lid, in its open end position, will no longer project horizontally into the front passenger space but will rest in a space-saving manner against the outer contour of the center console. This considerably improves the front passenger's safety, particularly in view of a head impact, because the glove compartment lid no longer projects horizontally into the front passenger space. In order to nevertheless permit the depositing of beverage containers in the area of the glove compartment lid, at least one bow shaped holder is integrated into the glove compartment lid in a simple manner and can be swivelled out into a horizontal operating position.

In an embodiment of the invention, one connecting link path respectively is provided in the opposite lateral walls of the glove compartment and extends in a curved manner along the contour of the front opening of the glove compartment and in which one hinge pin respectively of the hinge arrangement of the glove compartment lid is arranged in a slidably movable manner. This is a particularly simple and operationally reliable embodiment for causing a movement of the glove compartment lid along the outer contour of the center console area into its opened end position.

In a further development of the invention, the connecting link paths are provided with a stop for the opened end position of the glove compartment lid. As the result, the glove compartment lid is held in a defined position in its opened condition.

In a further development of the invention, one pocket-type recess respectively is provided in opposite narrow sides of the glove compartment lid for receiving one bow shaped holder respectively. This is a particularly space-saving and advantageous development of the invention.

In a further development of the invention, each bow shaped holder is disposed by means of a combined swivel and linear guide bearing in the pertaining recess by means of which it can first be pulled about a horizontal axis out of the recess and can then be swivelled into its horizontal operating position. As the result of this further development, the bow shaped holder requires only a single bearing shaft along which it can be moved in a linear manner and about which it can be swivelled. Naturally, a stop is assigned to the swivel and linear guide bearing which defines the horizontal operating position of the bow shaped holder.

In a further development of the invention, at a distance below each bow shaped holder, one supporting element respectively can be pulled horizontally out of the respective narrow side of the glove compartment lid. This supporting element is used as the bottom support for a beverage container with a cylindrical jacket which is deposited in the bow shaped holder and which, without the supporting element, would slide downward through the bow shaped holder.

In a further development of the invention, a sliding blind is assigned to the front opening of the glove compartment which, when the glove compartment lid is open, can be moved in front of the front opening for closing the front opening. As a result, even when the glove compartment lid is open, the glove compartment can be closed as required in order to improve particularly the appearance of the center console area and prevent a view into a possibly messy glove compartment.

Other objects, advantages and novel features of the present invention will become apparent from the following detailed description of the invention when considered in conjunction with the accompanying drawings.

DETAILED DESCRIPTION OF THE DRAWINGS

Figure 1:
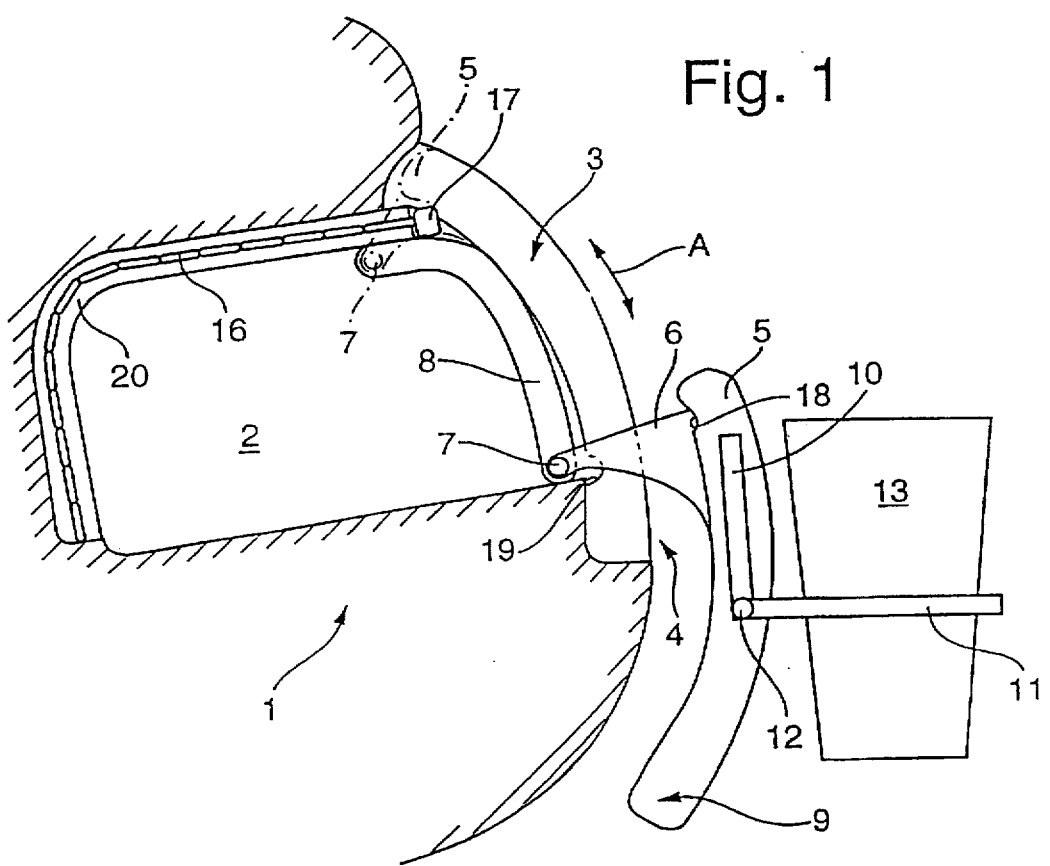
FIG. 1 is a schematic lateral sectional view of an embodiment of a front-passenger-side center console area according to the invention in the area of a glove compartment whose glove compartment lid is held in a space-saving manner close to the outer contour of the center console area in its opened end position.

A center console area 1 for a front passenger side of a passenger car has a glove compartment 2 which is integrated into the center console area 1. On the front side, in the area of an outer contour 4 of the center console area 1, the glove compartment 2 has a front opening 3 which can be closed by means of a glove compartment lid 5 adapted to the outer contour 4 of the center console area 1. The glove compartment lid 5 has a plate-type but curved shape and has two hinge bows 6 which project toward the rear to the glove compartment 2 and which are each provided with a horizontally projecting hinge pin 7. By means of this hinge pin 7, each hinge bow 6 is disposed in a connecting link guide 8, in which case both connecting link guides 8 are embedded in opposite lateral walls of the glove compartment 2. Each connecting link guide 8 extends along the whole height of the glove compartment 2 and is constructed in an approximate L-shape. A long curved leg of the L-shape of the connecting link guide 8 extends in parallel to the front opening 3 along the height of the glove compartment 2 and, in an upper area, is extended approximately horizontally to a rear wall of the glove compartment 2 toward the rear. The short leg of each connecting link guide 8, which is extended toward the rear, is used for receiving the hinge pin 7 in the closed end position of the glove compartment lid 5 (dash-dotted representation). In its closed end position, the glove compartment lid 5 can be locked by means of a detent device which is not shown and which can be unlocked by means of an operating button or another operating element. As soon as the detent device is unlocked, the glove compartment lid 5 moves automatically—possibly aided by means of additional spring and damping elements—toward the outside and downward in the direction of the double arrow A until it has reached its open end position.

In this open end position, the glove compartment lid 5 is aligned approximately vertically and extends in parallel and at a slight distance from the outer contour 4 of the center console area 1. In its open end position, the glove compartment lid 5 is therefore aligned in an extremely space-saving manner and particularly does not project into the front passenger space so that it can also not become a safety risk in the event of the front passenger's head impact.

In the opposite narrow sides 9 of the glove compartment lid 5, one pocket-type recess 10 respectively is provided which is used for receiving a bow shaped holder 11 for one cup 13 respectively. These recesses open laterally at the lid coverings through end walls at the narrow sides 9. Each bow shaped holder 11 in the two opposite recesses 10 is disposed about a horizontal bearing shaft 12 in the area of a bottom side of each recess 10 in the glove compartment lid 5. In this case, the bow shaped holder 11 has a telescope-type shaft projection which is linearly displaceable on the bearing shaft 12 and furthermore permits a swivelling of the bow holder 11 about the bearing shaft 12. In addition, in the area of the bearing shaft 12, the bow shaped holder 11 is equipped with a stop for the horizontal operating position illustrated in FIG. 1, in which the cup 13 can be deposited in the bow shaped holder 11. By means of this development of the combined swivel and linear guide bearing of each bow shaped holder 11, the bow shaped holder 11 can first, in a vertically aligned position, be pulled out of the pocket-type recess 10 (corresponding arrow B in FIG. 2) and can then be folded toward the front into the horizontal operating position (corresponding to arrow C in FIG. 2). For receiving the cup 13, each bow shaped holder 11 has a C-type closed bow which is constructed in one piece with the shaft projection. For the swivelling-back of the bow shaped holder 11 into its inoperative position within the recess 10, the bow shaped holder 11 is first swivelled vertically upwards again until it is aligned with the recess 10 and is subsequently pushed toward the inside of the glove compartment lid 5. Also in the case of this development, it is possible to provide a detent for the inoperative position of the bow shaped holder 11 which can be unlocked by means of an axial manual pressure onto the bow shaped holder 11.

Figure 2:
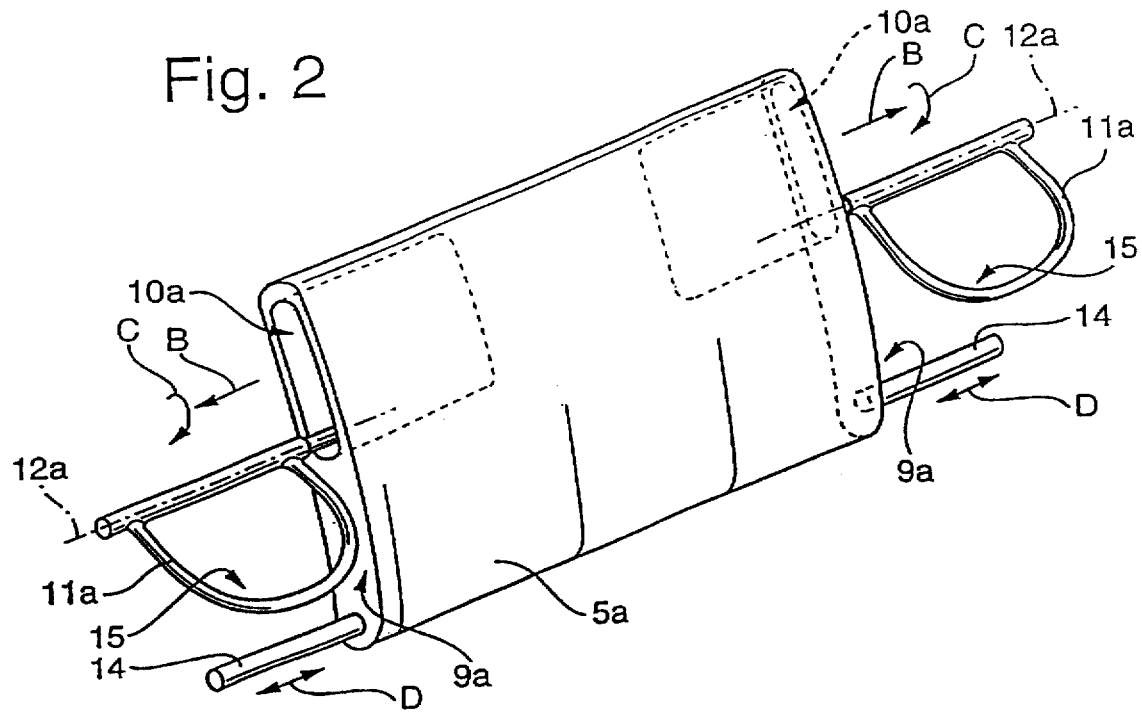
FIG. 2 is a perspective representation of a glove compartment lid similar to FIG. 1, in which the glove compartment lid is provided with two bow shaped holders for receiving beverage containers.

With respect to all significant operating elements, the glove compartment lid 5a according to FIG. 2 corresponds to the glove compartment lid 5 according to FIG. 1, in which case elements of the glove compartment lid 5 which have the same function are provided with the same reference symbols with the addition of a small letter (a). The two bow shaped holders 11a each bound a receiving opening 15 for accommodating a beverage container. Centrally below the receiving opening 15—relative to the horizontal operating position of the bow shaped holders 11a—the glove compartment lid 5a, in addition, has a rod-type supporting element for each bow shaped holder 11a which can be pulled in the direction of the arrow D horizontally and linearly out of the respective narrow side 9a of the glove compartment lid 5a. Each supporting element 14 is used as a bottom support for a corresponding beverage container which is placed in the receiving opening 15 of the respective bow shaped holder 11a. By means of this additional supporting element 14, which can be lowered completely into the glove compartment lid 5a, beverage containers can also be accommodated whose exterior walls do not taper toward their bottom. Thus, in particular, cylindrical beverage containers, such as cans or corresponding glasses can also be accommodated.

In order to hide the interior of the glove compartment 2 when the glove compartment 5 is open nevertheless from a view from the outside, the glove compartment lid 2, in addition, is provided with a sliding blind 16 which is disposed in a guideway 20 along the upper and the rear contour of the glove compartment 2. On its front end, the sliding blind 16 has a grip strip 17 for manually changing the sliding blind 16 into its position in which it closes the glove compartment. Since, when the sliding blind 16 is open, the gripping side 17 would project into the contour of the glove compartment lid 5, the glove compartment lid 5 is provided in this area with a groove-type indentation 18. In the area of a lower end of the front opening 3, a groove-type detent point 19 is provided in which the grip strip 17 can be locked when the sliding blind 16 is pulled downward in front of the glove compartment lid 2. As a result, the closed end position of the sliding blind 16 is constructed as a detent position. The sliding blind 16 can be operated only when the glove compartment lid 5 is open. When the glove compartment lid 5 is closed, the sliding blind 16 is in its inoperative position in which it is pushed back into the guideway 20 and exposes the front opening 3 of the glove compartment 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle glove compartment lid assembly comprising:
    a lid member having a passenger side covering and a glove compartment recess side covering connected together by end walls, wherein a stowage recess is formed between said coverings which is open toward one of said end walls, wherein said lid member has open and closed positions,
    and a beverage holder movable between the stowage recess and an in use position disposed laterally of said lid member when said lid member is in said open position.

2. A vehicle glove compartment lid assembly according to claim 1, wherein a pair of said stowage recesses is provided which opens to each of said end walls, and wherein one of said beverage holders is disposed in each of said stowage recesses.

3. A vehicle glove compartment according to claim 1, wherein said beverage holder includes:

a tubular member slidably disposed on a rod disposed in the stowage recess, and a U-shaped bow member fixed to the tubular member such that said bow member and tubular member define a beverage container accommodating opening when in an in use position.

4. A vehicle glove compartment according to claim 3, further comprising a support rod slidably disposed in said end wall for movement between a stowed position and an in use position spaced underneath the bow member and tubular member to support a bottom of a beverage container when in an in use position.

5. A vehicle glove compartment according to claim 4, wherein a pair of said stowage recesses is provided which opens to each of said end walls, and- wherein one of said beverage holders is disposed in each of said stowage recesses.

6. A vehicle glove compartment according to claim 1, comprising a movable blind for selectively closing a glove compartment opening covered by the lid member when the lid member is in an open position with the beverage holder in its in use position.

7. A vehicle glove compartment according to claim 6, wherein one of said stowage recesses is provided which opens to each of said end walls, and wherein one of said beverage holders is disposed in each of said stowage recesses.

8. A vehicle glove compartment according to claim 1, further comprising a linkage for connecting the lid member to a vehicle console such that said lid member, when in an open position, is in a closely spaced parallel position with respect to the vehicle structure console structure under a glove compartment opening covered by the lid member when in a closed position.

9. A vehicle glove compartment lid assembly comprising:

a lid member having a passenger side covering and a glove compartment recess side covering connected together by end walls, wherein a stowage recess is formed between said coverings, a linkage for connecting the lid member to a vehicle console such that said lid member, when in an open position, is in a closely spaced parallel position with respect to the vehicle structure console structure under a glove compartment opening covered by the lid member when in a closed position, and a beverage holder movable between the stowage recess and an in use position in front of the opened lid member.

10. A vehicle glove compartment lid assembly according to claim 9, wherein a pair of said stowage recesses is provided which opens to each of said end walls, and wherein one of said beverage holders is disposed in each of said stowage recesses.

11. A vehicle glove compartment lid assembly according to claim 9, wherein said beverage holder includes:

a tubular member slidably disposed on a rod disposed in the stowage recess, and a U-shaped bow member fixed to the tubular member such that said bow member and tubular member define a beverage container accommodating opening when in an in use position.

12. A vehicle glove compartment lid assembly according to claim 9, further comprising:

a support rod slidably disposed in said end wall for movement between a stowed position and an in use position spaced underneath the bow member and tubular member to support a bottom of a beverage container when in an in use position.

13. A vehicle glove compartment lid assembly according to claim 9, further comprising:

a movable blind for closing the glove compartment opening separately from the lid member.

14. A vehicle glove compartment lid assembly according to claim 11, wherein a pair of said stowage recesses is provided wherein each stowage recess opens to a respective said end wall, and wherein one of said beverage holders is disposed in each of said stowage recesses.

15. A vehicle glove compartment lid assembly according to claim 12, wherein a pair of said stowage recesses is provided wherein each stowage recess opens to a respective said end wall, and wherein one of said beverage holders is disposed in each of said stowage recesses.

16. A vehicle glove compartment lid assembly according to claim 13, wherein a pair of said stowage recesses is provided wherein each stowage recess opens to a respective said end wall, and wherein one of said beverage holders is disposed in each of said stowage recesses.

* * * * *